(12) United States Patent
Klein

(10) Patent No.: US 9,822,887 B2
(45) Date of Patent: Nov. 21, 2017

(54) TWO PHASE BALL EXPANSION VALVE FOR HEAT PUMP

(71) Applicant: Halla Visteon Climate Control Corp., Daejeon (KR)

(72) Inventor: Torsten Klein, Köln (DE)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 14/621,594

(22) Filed: Feb. 13, 2015

(65) Prior Publication Data

US 2015/0226340 A1    Aug. 13, 2015

(51) Int. Cl.
*F16K 5/06* (2006.01)
*F16K 5/20* (2006.01)

(52) U.S. Cl.
CPC ............ *F16K 5/0605* (2013.01); *F16K 5/20* (2013.01)

(58) Field of Classification Search
CPC . F16K 5/0605; F16K 5/06; F16K 5/20; F16K 5/12; F16K 5/10; F16K 5/08; F16K 5/04; F16K 5/0407
USPC ............... 251/315.01–315.16, 208–209, 205
See application file for complete search history.

(56) References Cited

U.S. PATENT DOCUMENTS

| | | | | |
|---|---|---|---|---|
| 697,739 A | * | 4/1902 | Loygorri ............... | F16K 11/083 137/625.16 |
| 2,987,295 A | * | 6/1961 | Schenck ............... | F16K 5/0271 251/288 |
| 3,398,926 A | * | 8/1968 | Scaramucci ........... | F16K 5/0668 251/172 |
| 3,542,337 A | * | 11/1970 | Scaramucci ........... | F16K 5/0605 251/151 |
| 3,542,338 A | * | 11/1970 | Scaramucci ........... | F16K 5/0605 251/209 |
| 3,556,471 A | * | 1/1971 | Paul, Jr. ................ | F16K 5/0673 251/172 |
| 3,762,682 A | * | 10/1973 | Franck ................... | F16K 5/10 251/124 |
| 3,883,113 A | * | 5/1975 | Kolb ...................... | F16K 5/0605 251/151 |
| 4,291,859 A | * | 9/1981 | Qasim .................... | F16K 5/0605 251/123 |
| 4,881,718 A | * | 11/1989 | Champagne ............ | F16K 5/0605 251/209 |

(Continued)

FOREIGN PATENT DOCUMENTS

DE          10140693 A1 *  3/2003  ........... F16K 5/0605
DE     102007025516 A1     12/2008
(Continued)

*Primary Examiner* — Kevin Murphy
*Assistant Examiner* — David Colon Morales
(74) *Attorney, Agent, or Firm* — Shumaker, Loop & Kendrick, LLP; James D. Miller

(57) ABSTRACT

A device for expansion of coolant having a housing with a flow channel. A ball-shaped valve element arranged to be integrated inside the housing. The valve element is mounted so that it can turn about an axis of rotation and is configured with a through channel. The through channel of the valve element is configured with an entry opening and an exit opening and arranged so that the flow cross section of the through channel decreases from the entry opening to the exit opening in the direction of flow of the coolant. At the exit of the through channel the least flow cross section is formed.

16 Claims, 2 Drawing Sheets

(56) References Cited

U.S. PATENT DOCUMENTS

| | | | | |
|---|---|---|---|---|
| 5,028,326 A | * | 7/1991 | Littler | B01D 11/02 |
| | | | | 210/251 |
| 5,181,539 A | * | 1/1993 | Yokoyama | F16K 5/06 |
| | | | | 137/238 |
| 5,205,533 A | * | 4/1993 | Berchem | F16K 5/0605 |
| | | | | 137/375 |
| 5,353,832 A | * | 10/1994 | Berchem | F16K 5/0605 |
| | | | | 137/375 |
| 5,562,116 A | * | 10/1996 | Henwood | F16K 1/22 |
| | | | | 137/15.22 |
| 5,590,680 A | * | 1/1997 | Gugala | F16K 5/0694 |
| | | | | 137/312 |
| 5,988,586 A | * | 11/1999 | Boger | F16K 47/08 |
| | | | | 138/42 |
| 6,540,206 B2 | * | 4/2003 | Guerra | F16K 5/0605 |
| | | | | 137/270 |
| 7,178,782 B1 | * | 2/2007 | York | F16K 5/12 |
| | | | | 137/625.3 |
| 7,478,800 B2 | * | 1/2009 | Keller | F02M 35/10032 |
| | | | | 251/315.01 |
| 2004/0206404 A1 | * | 10/2004 | Yang | F16K 5/0605 |
| | | | | 137/614.17 |

FOREIGN PATENT DOCUMENTS

| | | |
|---|---|---|
| JP | 06-086914 B | 11/1994 |
| JP | H09133226 A | 5/1997 |

\* cited by examiner

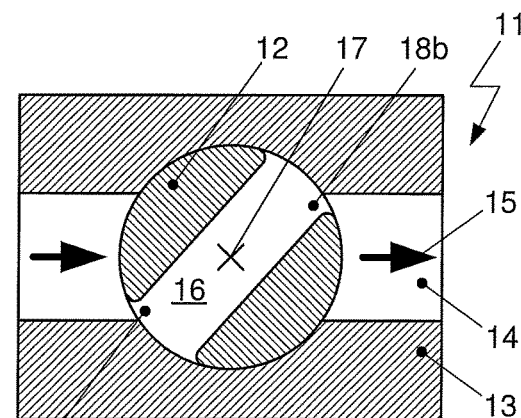
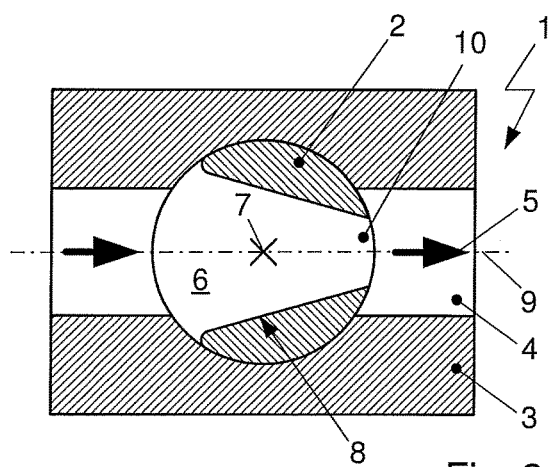 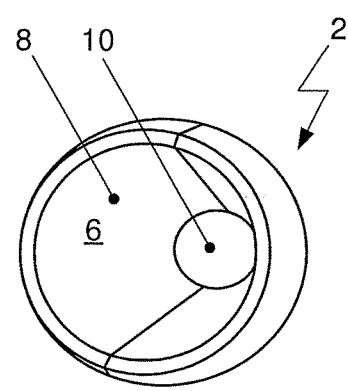
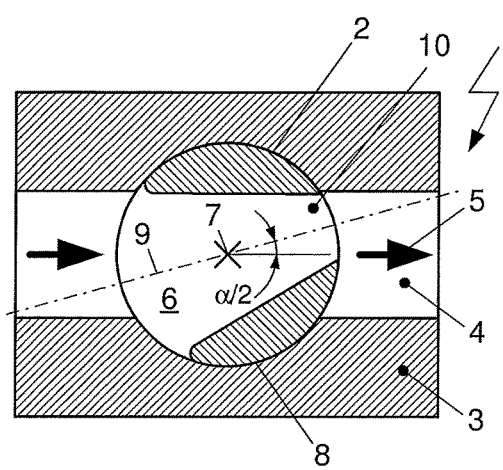 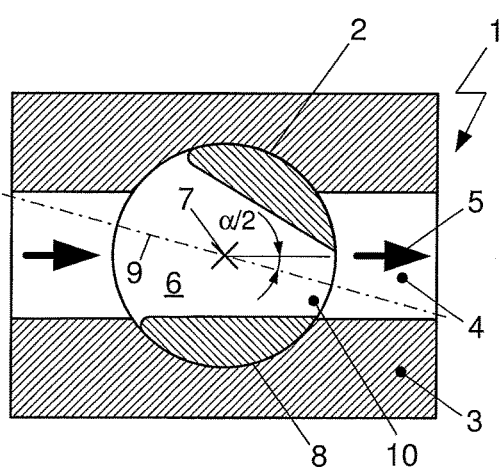
Fig. 1 PRIOR ART
Fig. 2A
Fig. 3
Fig. 2B
Fig. 2C

TWO PHASE BALL EXPANSION VALVE FOR HEAT PUMP

CROSS-REFERENCE TO RELATED APPLICATIONS

This application claims priority to German Patent Application No. DE 10-2014-101794.3, filed on Feb. 13, 2014, the disclosure of which is incorporated herein by reference in its entirety.

FIELD OF THE INVENTION

The invention concerns a device for the expansion of a coolant with a housing with a flow channel and a ball-shaped valve element, arranged to be integrated inside the housing. The valve element is mounted so that it can turn about an axis of rotation and is configured with a through channel.

BACKGROUND OF THE INVENTION

A plurality of functions are being increasingly integrated in coolant systems, especially for motor vehicle air conditioning systems, which entail high demands on the individual components of the particular coolant system. For example, a heat pump functionality is being increasingly provided in the design of coolant systems for motor vehicles. The components used in this case, especially the valves and the expansion elements, have to be outfitted with increased functions. For example, the valves have to be designed to be bidirectional with regard to the flow direction of the coolant.

Expansion valves arranged in a coolant circuit, by a locally designed narrowing of the flow cross section, are used for a reduction of the pressure of the flowing coolant and thus, a volume increase or an expansion of the coolant. The expansion valve is arranged in the coolant circuit upstream from the evaporator, so that the compressed liquid coolant expands into the evaporator. Thus, the expansion valve forms the interface between the high-pressure side and the lower-pressure side of the coolant circuit, which furthermore has at least one compressor and one condenser downstream from the evaporator in the direction of flow of the coolant.

Traditional ball valves have a servo drive, which drives a shaft mounted in a shaft bearing. The shaft transmits the rotary motion to a valve element, which is configured as a ball with a through channel. The components are mounted inside a valve housing. Ball valves are considered to be robust and economical and they are used for diverse applications.

FIG. 1 shows the cross section of a familiar ball valve 11 of the prior art in simplified form. The ball-shaped valve element 12 is arranged inside a housing 13 and able to turn about an axis of rotation 17. The valve element 12 has a through channel 16 and the housing 13 has a flow channel 14. In the at least partly opened position of the valve element 12 in regard to the flow channel 14 of the housing 13, the fluid flows through the ball valve 11 in the direction of flow 15.

In the arrangement of the ball valve 11 shown in FIG. 1, the ball-shaped valve element 12 is rotated within the housing 13 such that a minimum flow opening is adjusted for the fluid. Two minute openings 18a, 18b are formed at the entrance to the through channel 16 and at the exit from the through channel 16, respectively. When the ball valve 11 is installed inside a coolant circuit, these small openings act as expansion cross sections 18a, 18b. The coolant is expanded both when flowing through the first expansion cross section 18a and when flowing through the second expansion cross section 18b. Since a vapor phase is formed during the expansion process, especially after the expansion cross section 18a, the flow cross section is blocked. A correct regulating of the coolant mass flow by adjusting the valve element 12 of the ball valve 11 is not possible.

DE 10 2007 025 516 A1 discloses a ball cock for shutting off and opening a pipeline in controlled manner The ball cock has a housing with a housing inlet and a housing outlet, also a valve ball with entry openings and an exit opening, as well as an outside activated adjusting device for turning the valve ball around its axis of rotation. The cross section of the exit opening is symmetrical to a plane oriented with the center axis of the entry opening and perpendicular to the axis of rotation. The ball has a third circular opening, whose axis lies in the plane of symmetry and intersects the center axis of the entry opening at right angles. With the help of the described ball cock, the regulation of the flow rate of fluids is improved and in particular it becomes linear over a larger range, experiencing no phase change upon flowing through the ball cock.

However, few suitable components are available in the prior art for use in a coolant circuit, so that there is a need to modify existing components and adapt them to the new chores. In particular, with the ball valves known in the prior art, no precise regulation of the mass flow of coolant is possible, especially on account of the unwanted expansion and evaporation of the coolant upon flowing through the ball valve.

SUMMARY OF THE INVENTION

The problem to be solved by the present invention is to provide a valve, especially an expansion valve, for use in coolant systems for motor vehicle air conditioning systems. A robust and economical component should be adapted for the coolant circuit, making possible a precise regulation of the coolant mass flow.

The problem is solved according to the invention by a device for expansion of coolant. The device has a housing with a flow channel and a ball-shaped valve element, arranged to be integrated inside the housing. The valve element is mounted so that it can turn about an axis of rotation and is configured with a through channel.

A coolant is a fluid which expands upon flowing through the device and experiences at least partly a change of state or a phase change from liquid to gaseous. Liquid coolant evaporates upon volume increase, so that the coolant is present in the two-phase liquid/gaseous realm after the expansion. Moreover, by coolant is meant a fluid which takes up heat at low temperature and low pressure and surrenders the heat at higher temperature and higher pressure, whereupon changes in state of the fluid usually occur.

By the design of the invention, the through channel of the valve element is configured with an entry opening and an exit opening and arranged so that the flow cross section of the through channel decreases from the entry opening to the exit opening in the direction of flow of the coolant. At the exit, the through channel is fashioned with the least flow cross section according to the invention.

According to one modification of the invention, the through channel of the valve element is conically shaped. The through channel in this case is bounded by a surface of rotation which is formed by rotation of a line about an axis of symmetry. The round flow cross section of the through channel is reduced uniformly from the entry opening with a larger diameter to the exit opening with a smaller diameter.

The conically shaped through channel preferably has the shape of a truncated cone. The truncated cone is advantageously shaped as a straight truncated cone.

According to an alternative embodiment of the invention, the flow cross section of the entry opening of the through channel has a larger diameter than the flow cross section of the flow channel of the housing.

According to a second alternative embodiment of the invention, the flow cross section of the entry opening of the through channel has the same size diameter as the flow cross section of the flow channel of the housing.

The flow channel of the housing is advantageously formed with a constant flow cross section. The preferably round flow cross section has the same diameter for the entire length from the entry into the housing to the valve element and from the valve element to the exit from the housing.

According to one advantageous embodiment of the invention, the flow cross section of the exit opening of the through channel is formed with a smaller diameter than the flow cross section of the flow channel of the housing.

The entry opening to the through channel of the valve element is preferably rounded in the transitional zone from the surface of rotation to the outer surface of the valve element in order to prevent swirling of the coolant upon entering the valve element.

According to one modification of the invention, the valve element is continuously adjustable in intermediate positions between the end positions "fully opened" and "closed".

The valve element is preferably arranged and configured so that the valve element is turned by 90° between the end positions "fully opened" and "closed".

According to another embodiment of the invention, the valve element is continuously adjustable in intermediate positions between three end positions "fully opened", "closed" and "fully opened" so that the valve element is turned by 180° between the two end positions "fully opened" and "fully opened".

The valve element can preferably have a bidirectional flow of coolant through it, that is, the valve element can receive coolant from either end.

The device according to its design is used in a coolant circuit of an air conditioning system for conditioning the air of the passenger compartment of a motor vehicle.

The air conditioning system is preferably designed for a combined operation in cooling system mode and heating mode or heat pump mode, and for an afterheating mode.

Further benefits of the invention over the prior art can be summarized as follows:
  regulation of the mass flow of coolant by configuring only one expansion cross section as a flow opening between the housing and the valve element,
  regulation by linear function between the mass flow of coolant and the position of the valve element,
  pressure of the coolant presses the ball-shaped valve element against the housing and thus ensures tightness of the valve, and
  reduction of the manufacturing, maintenance and installation expense by simple design and the associated costs.

BRIEF DESCRIPTION OF THE DRAWINGS

Further details, features, and benefits of the invention will emerge from the following specification of sample embodiments making reference to the corresponding drawings. There are shown:

FIG. 1: cross section of a ball valve according to the prior art;

FIG. 2A to 2C: device with modified valve element in "fully opened" position;

FIG. 3: valve element from FIG. 2A to 2C in perspective view,

DETAILED DESCRIPTION OF EXEMPLARY EMBODIMENTS OF THE INVENTION

Figures 4A, 4B:
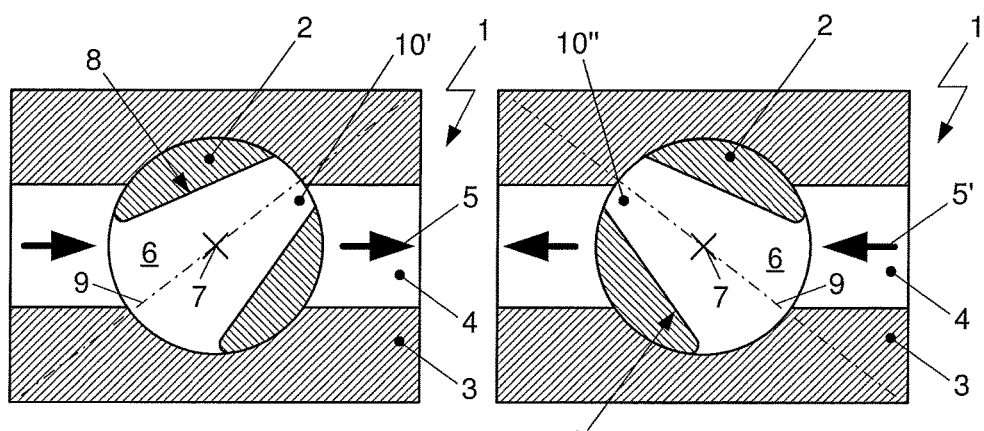
FIG. 4A: switch position of the valve element from FIG. 2A to 2C with flow direction to the right.
FIG. 4B: switch position of the valve element from FIG. 2A to 2C with flow direction to the left.

The following detailed description and appended drawings describe and illustrate various embodiments of the invention. The description and drawings serve to enable one skilled in the art to make and use the invention, and are not intended to limit the scope of the invention in any manner.

FIGS. 2A to 2C show the device 1 for expansion of coolant, especially for a coolant circuit of an air conditioning system of a motor vehicle, each time in the "fully opened" position.

The device 1, configured as a ball valve, essentially comprises a servo drive (not shown), a shaft (not shown) as the connection between the servo drive and a ball-shaped valve element 2 with a through channel 6 as the flow channel for the coolant, as well as a housing 3 as a support for the valve element 2. The valve element 2 is mounted so it can turn about an axis of rotation 7. The housing 3 is fashioned with a flow channel 4.

Consequently, the device 1 is a so-called expansion ball valve.

In the at least partly opened position of the valve element 2, the coolant flows in the flow direction 5 from right to left through the device 1. In the positions of the valve element 2 "fully opened" as shown in FIG. 2A to 2C, the maximum mass flow of coolant flows through the device 1. An expansion cross section 10 is completely clear and not covered by the housing 3.

Even deviating from the horizontal position of FIG. 2A, the device 1 remains within a "fully opened" angle α, while the valve element 2 per FIG. 2B and 2C can be moved in both directions of turning by the angle α/2 each time.

The ball-shaped valve element 2, which has been modified from the prior art, is fashioned with the through channel 6 as a conical hole. Traditional ball valves 11 per FIG. 1, on the other hand, have valve elements 2 with cylindrical through channels 16. The conical shape of the through channel 6 also emerges from FIG. 3, which shows the valve element 2 in a perspective view.

The flow channel 6 bounded by a surface of rotation 8 has the shape of a truncated cone. The surface of rotation 8 is formed here by rotation of a straight line about the axis of symmetry 9. The round flow cross section of the through channel 6 is reduced uniformly by means of the conical shape between two nominal widths, that is, from the entry opening with a cross section with larger diameter to the exit opening with a cross section with smaller diameter. The round flow cross section with the smaller diameter corresponds to the expansion cross section 10 in the positions "fully opened" of the valve element 2 per FIG. 2A to 2C.

The coolant flows in the flow direction 5 into the device 1, and it is taken through the through channel 4 and the housing 3 to the valve element 2. The transition from the flow channel 4 of the housing 3 to the through channel 6 of the valve element 2 is configured such that swirling of the coolant is minimized. Advantageously, the entry opening to the conical through channel 6 is rounded for streamlining at the transition from the surface of rotation 8 to the outer surface of the valve element 2. The entry opening of the through channel 6 has a larger or at least an equally large diameter to the flow channel 4.

The coolant upon emerging from the valve element 2 is expanded into the flow channel 4, since the exit opening being the expansion cross section 10 has a much smaller diameter than the adjoining flow channel 4 in the direction of flow 5 of the coolant.

The pressure built up by the coolant upon flowing through the ball-shaped valve element 2 with narrowing flow cross section presses the valve element 2 against the housing 3 so that the tightness of the valve is assured.

The valve element 2 mounted with ability to turn about the axis of rotation 7 can be adjusted continuously in intermediate positions between the three end positions of "fully opened", "closed" and "fully opened". Between the end positions of "fully opened" and "closed" the valve element 2 is turned each time through 90°, while the valve element 2 within each end position can be turned in a particular angle range and has the condition of "fully opened" or "closed".

FIG. 4A shows the valve element 2 of FIG. 2 in an intermediate position with flow direction 5 of the coolant from left to right. The valve element 2 is moved counter-clockwise about the axis of rotation 7, as compared to the position from FIG. 2. During the movement, the housing 3 increasingly covers the exit opening of the through channel 6, so that the expansion cross section 10', as the smallest flow cross section through the device 1, is decreased as the movement continues. The mass flow of coolant becomes smaller. Since the expansion cross section 10' is configured as the only site with the smallest flow cross section, there is no risk of an indefinable expansion and thus evaporation of the coolant in another place, which would block the flow cross section and hinder a correct regulation of the mass flow of coolant.

Figures 5A, 5B:
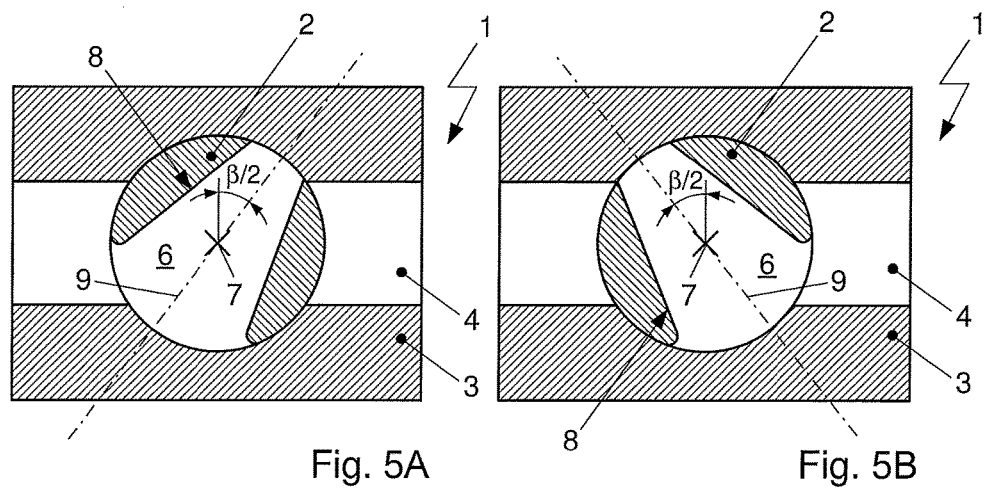
FIG. 5A and 5B: device with modified valve element in "closed" position.

A further turning of the valve element 2 results in the wall of the valve element 2 completely blocking the flow channel 4 of the housing 3, as can be seen in FIG. 5A and 5B. In the "closed" middle position of the valve element 2 (not shown), the axis of symmetry 9 is perpendicular in relation to one of the "fully opened" end positions.

Even in a position deviating from the perpendicular position, the device 1 remains within a "closed" angle β, while the valve element 2 per FIG. 5A and 5B can be moved in both directions of turning by the angle β/2 each time.

FIG. 4B shows the valve element 2 from FIG. 2 in an intermediate position with the flow direction 5' of coolant from right to left. The valve element 2 is further moved counterclockwise about the axis of rotation 7 as compared to the position from FIG. 4A. During the movement, the exit opening of the through channel 6 is increasingly opened up, so that the expansion cross section 10", as the smallest flow cross section through the device 1, is increased as the movement continues. The mass flow of coolant becomes larger. Since the expansion cross section 10" is once again configured as the only site with the smallest flow cross section, there is likewise no risk of an indefinable expansion and thus evaporation of the coolant in another place, so that a correct regulation of the mass flow of coolant is possible.

After a turning by a total of 180° to the "fully opened" end position of FIG. 2, the valve element 2 is back at the "fully opened" end position, and coolant flows through the device 1 in the opposite flow direction.

Thus, the device 1 configured as a ball valve can receive a bidirectional flow, or flow from either side, and it enables the correct regulation of the mass flow of coolant by configuring only a single expansion cross section 10', 10" as the through opening between the housing 3 and the valve element 2.

The device 1 is furthermore able to operate with an actuator as the servo element in a regulatory circuit, that is, an element which transforms the input variable into a different output variable, which the valve element 2 has to move by an angle of rotation of at most 180°. The movement of the valve element 2 furthermore includes the "closed" position, so that the device 1 also performs the function of a shutoff valve.

While certain representative embodiments and details have been shown for purposes of illustrating the invention, it will be apparent to those skilled in the art that various changes may be made without departing from the scope of the disclosure, which is further described in the following appended claims.

LIST OF REFERENCE NUMBERS 1 device
2 ball-shaped valve element
3 housing
4 flow channel of housing 3
5, 5' coolant direction of flow
6 through channel
7 axis of rotation
8 surface of rotation
9 axis of symmetry
10, 10', 10" expansion cross section
11 ball valve
12 ball-shaped valve element
13 housing, support element
14 flow channel of housing 13
15 direction of flow
16 through channel
17 axis of rotation
18a, 18b opening, expansion cross section
α angle for turning within "fully opened" position
β angle for turning within "closed" position

What is claimed is:

1. A device for expansion of a coolant, the device comprising:
a housing with a flow channel formed therein, the flow channel including a first segment having a first cross-sectional flow area and a second segment having a second cross-sectional flow area, wherein the first cross-sectional flow area is substantially equal to the second cross-sectional flow area; and
a ball-shaped valve element disposed in the housing intermediate the first cross-sectional flow area of the first segment of the flow channel and the second cross-sectional flow area of the second segment of the flow channel and configured to rotate about an axis of rotation, the valve element having a through channel formed therein configured for selective fluid communication with the flow channel of the housing, the through channel including an entry opening having a third cross-sectional flow area and an exit opening having a fourth cross-sectional flow area smaller than the third cross-sectional flow area, wherein the third cross-sectional flow area of the entry opening is larger than each of the first cross-sectional flow area of the first segment of the flow channel and the second cross-sectional flow area of the second segment of the flow channel, and wherein the fourth cross-sectional flow area of the exit opening is smaller than each of the first cross-sectional flow area of the first segment of the flow channel and the second cross-sectional flow area of the second segment of the flow channel, wherein the valve element is continuously adjustable in intermediate positions between a first fully opened end position, a fully closed position, and a second fully opened end position, and wherein the valve element is turned by 180° between the first fully opened end position and the second fully opened end position, wherein a first overlap present between the third cross-sectional flow area of the entry opening and one of the first cross-sectional flow area of the first segment of the flow channel and the second cross-sectional flow area of the second segment of the flow channel remains constant when the valve element is rotated through a first range of rotational positions and wherein a second overlap present between the fourth cross-sectional flow area of the exit opening and an other of the first cross-sectional flow area of the first segment of the flow channel and the second cross-sectional flow area of the second segment of the flow channel remains constant when the valve element is rotated through the first range of rotational positions, and wherein the first overlap and the second overlap establish the selective fluid communication between the through channel of the valve element and the flow channel of the housing.

2. The device according to claim 1, wherein the through channel of the valve element has a substantially conical shape.

3. The device according to claim 1, wherein the through channel of the valve element has a shape of a truncated cone.

4. The device according to claim 3, wherein the through channel of the valve element has the shape of a straight truncated cone.

5. The device according to claim 1, wherein the through channel is bounded by a surface of rotation which is formed by rotation of a line about an axis of symmetry to create a substantially circular flow cross section which reduces substantially uniformly from the entry opening with a larger diameter than the exit opening.

6. The device according to claim 1, wherein a diameter of the entry opening of the through channel is larger than a diameter of the flow channel of the housing.

7. The device according to claim 1, wherein a diameter of the entry opening of the through channel substantially equal to a diameter of the flow channel of the housing.

8. The device according to claim 1, wherein a diameter of the exit opening of the through channel is smaller than a diameter of the flow channel of the housing.

9. The device according to claim 1, wherein a transition zone at the entry opening to the through channel of the valve element between a surface forming the through channel and an outer surface of the valve element is rounded.

10. The device according to claim 1, wherein a first 90° turn adjusts the valve element between the first fully opened end position and the fully closed position and wherein a second 90° turn adjusts the valve element between the second fully opened end position and the fully closed position.

11. The device according to claim 1, wherein the valve element is configured to receive a bidirectional flow of the coolant therethrough.

12. A device for expansion of a coolant, the device comprising:
a housing with a flow channel formed therein, the flow channel including a first segment having a first cross-sectional flow area and a second segment having a second cross-sectional flow area, wherein the first cross-sectional flow area is substantially equal to the second cross-sectional flow area; and
a ball-shaped valve element disposed in the housing intermediate the first cross-sectional flow area of the first segment of the flow channel and the second cross-sectional flow area of the second segment of the flow channel and configured to rotate about an axis of rotation, the valve element having a through channel formed therein configured for selective fluid communication with the flow channel of the housing, the through channel including an entry opening having a third cross-sectional flow area and an exit opening having a fourth cross-sectional flow area smaller than the third cross-sectional flow area, a diameter of the entry opening of the through channel larger than a diameter of each of the first segment and the second segment of the flow channel of the housing and a diameter of the exit opening of the through channel smaller than the diameter of each of the first segment and the second segment of the flow channel of the housing, wherein the valve element is continuously adjustable in intermediate positions between a first fully opened end position, a fully closed position, and a second fully opened end position, and wherein the valve element is turned by 180° between the first fully opened end position and the second fully opened end position, wherein a first overlap present between the third cross-sectional flow area of the entry opening and one of the first cross-sectional flow area of the first segment of the flow channel and the second cross-sectional flow area of the second segment of the flow channel remains constant when the valve element is rotated through a first range of rotational positions and wherein a second overlap present between the fourth cross-sectional flow area of the exit opening and an other of the first cross-sectional flow area of the first segment of the flow channel and the second cross-sectional flow area of the second segment of the flow channel remains constant when the valve element is rotated through the first range of rotational positions, wherein the first overlap and the second overlap establish the selective fluid communication between the through channel of the valve element and the flow channel of the housing.

13. The device according to claim 12, wherein the through channel of the valve element has a substantially conical shape.

14. The device according to claim 12, wherein a transition zone at the entry opening to the through channel of the valve element between a surface forming the through channel and an outer surface of the valve element is rounded.

15. The device according to claim 12, wherein a first 90° turn adjusts the valve element between the first fully opened end position and the fully closed position and wherein a second 90° turn adjusts the valve element between the second fully opened end position and the fully closed position.

16. The device according to claim 12, wherein the valve element is configured to receive a bidirectional flow of the coolant therethrough.

* * * * *